United States Patent [19]

Ditzel et al.

[11] 4,015,513
[45] Apr. 5, 1977

[54] INDEXING DEVICES

[76] Inventors: Heins Ditzel; Werner Ditzel, both of Hainstrasse 27-29, 6369 Schoneck 1, Germany

[22] Filed: May 18, 1976

[21] Appl. No.: 687,603

Related U.S. Application Data

[62] Division of Ser. No. 628,649, Nov. 4, 1975.

[30] Foreign Application Priority Data

Nov. 5, 1974 Germany .......................... 2452340
May 6, 1975 Germany .......................... 2520022

[52] U.S. Cl. ...................................... 90/57; 279/5
[51] Int. Cl.² ...................... B23F 23/08; B23B 5/22
[58] Field of Search ........................... 90/57; 279/5

[56] References Cited

UNITED STATES PATENTS 2,345,312   3/1944   Sorensen ........................ 90/57
2,711,324   6/1955   Andreason ...................... 279/5

FOREIGN PATENTS OR APPLICATIONS 477,532   10/1951   Canada ............................. 90/57

*Primary Examiner*—Harrison L. Hinson

[57] ABSTRACT

An indexing head has a plurality of co-axial discs rotatable relative to each other. A first disc carries an indexing pin receivable in a series of equi-angularly spaced recesses of a second disc. A third disc is angularly settable relative to the second disc by means of gauge blocks, and is lockable after setting by locking means. A tool shank can be releasably held in an axial bore of the first disc. When used in an oil bath of an erosion machine, the head is fitted with a bellows skirt to prevent the oil reaching the discs.

6 Claims, 4 Drawing Figures

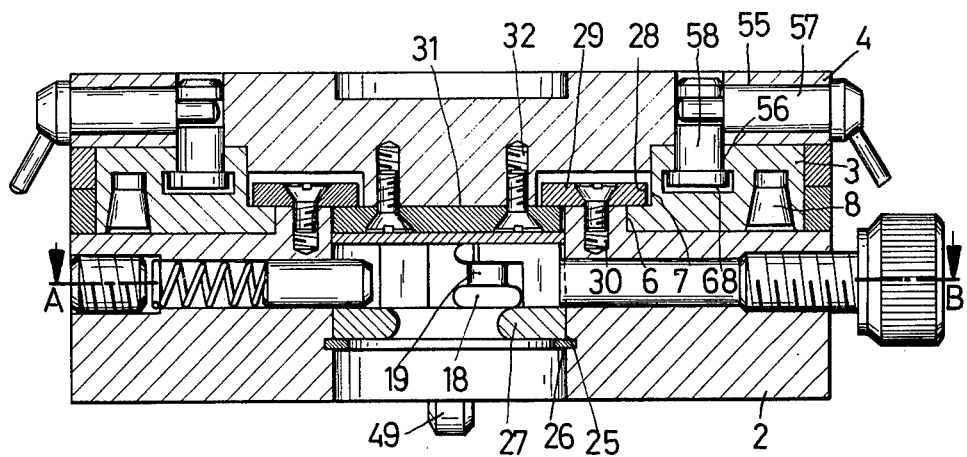
Fig. 3
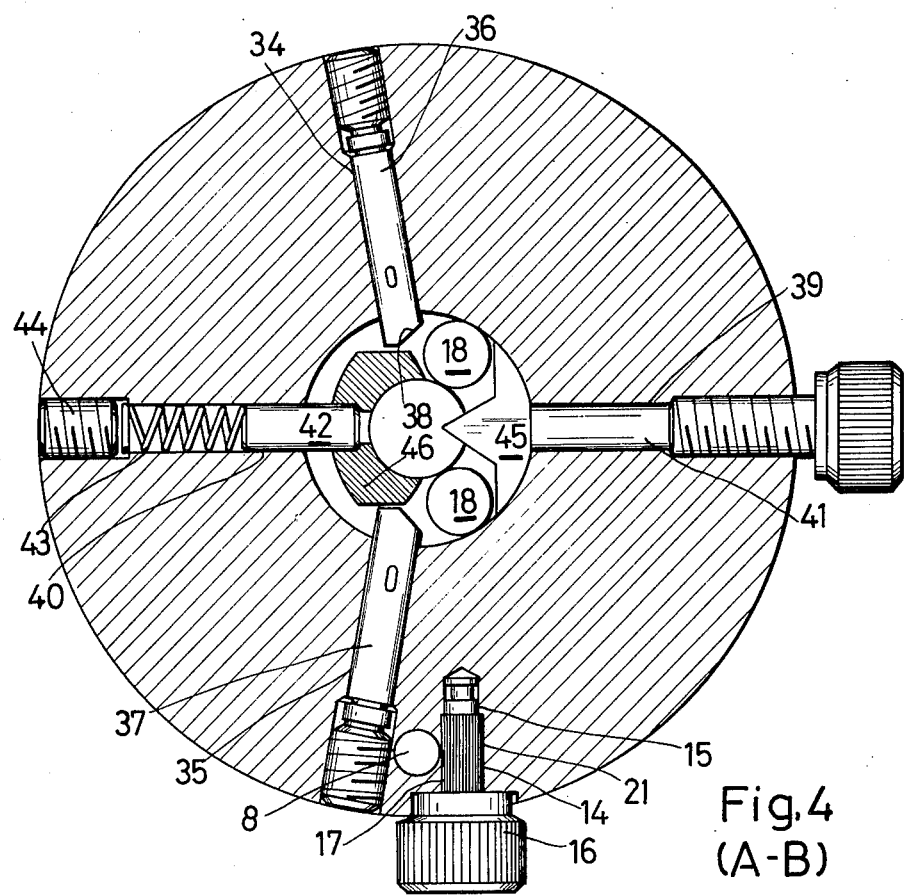
Fig. 4 (A-B)

INDEXING DEVICES

This is a divisional of applicants' copending application Ser. No. 628,649 filed Nov. 4, 1975, titled "Improvements in or Relating to Indexing Devices".

BACKGROUND OF THE INVENTION

1. Field of the Invention

This invention relates to indexing heads for use with machine tools, for example, erosion machines and fine grinders, and horizontal jig boring mills, in, for instance, the supermachining of workpieces.

2. Description of the Prior Art

There are known many indexing heads received by the spindle and carrying the tool, for the adjustment on all sides of workpieces on machine tools. As a rule, the known indexing heads have a graduation at a peripheral surface of a rotatable disc, and a counter-marking associated with a stationary disc, there being also optionally provided a so-called Vernier scale for fine setting. Such a form of graduation is, even in combination with a Vernier scale, no longer adequate for the accuracies required at the present time, in many cases the degree of accuracy required being to arc minutes and seconds.

Indexing heads are known from U.S. Pat. Nos. 3,049,032, 2,177,006 and 2,342,539, Swiss Pat. No. 542,687 and German Offenlegungsschriften Nos. 2,109,270 and 1,427,085. These known heads have the defect of extremely inconvenient construction, and they afford only relatively coarse setting or the setting or adjusting means are inconvenient to manipulate.

SUMMARY OF THE INVENTION

The present invention provides basically an indexing device comprising first, second and third discs substantially co-axial with one another, first and second engagement means of said first and second discs, respectively, interengageable to latch releasably said first and second discs in any selected one of a number of relative angular positions thereof, gauge means, respective abutment surfaces of the second and third discs, whereby said second and third discs can be angularly positioned relatively to each other by turning the second and third discs relatively to each other, with said gauge means disposed between said abutment surfaces, until said gauge means abuts both of said abutment surfaces; and clamping means including a clamping member movable in an axial direction of the discs to clamp said second and third discs against turning relatively to each other.

BRIEF DESCRIPTION OF THE DRAWINGS

In order that the invention may be clearly understood and readily carried into effect, reference will now be made, by way of example, to the accompanying drawings, in which:

FIGS. 2 and 3 show respective axial sections of the head; and

FIG. 4 shows a cross-section of the head taken along the line 4—4 of FIG. 3.

DESCRIPTION OF THE PREFERRED EMBODIMENT

Figure 1:
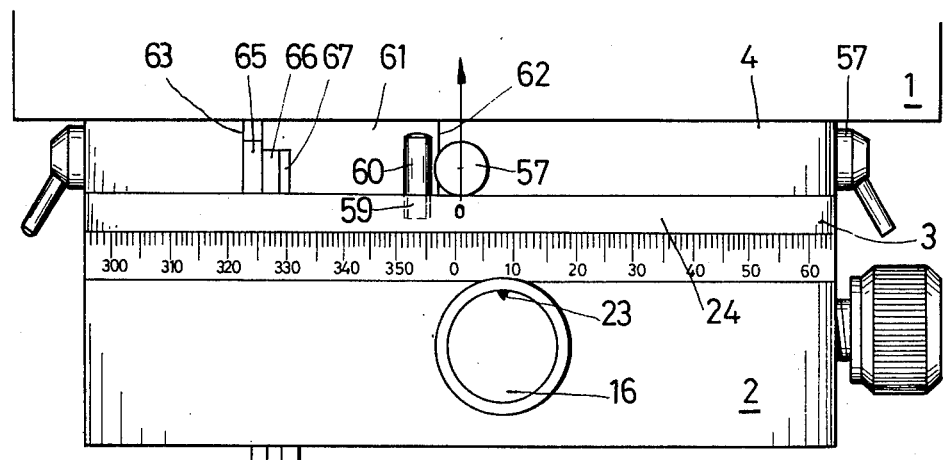
FIG. 1 shows an elevation of an indexing head.
Figure 2:
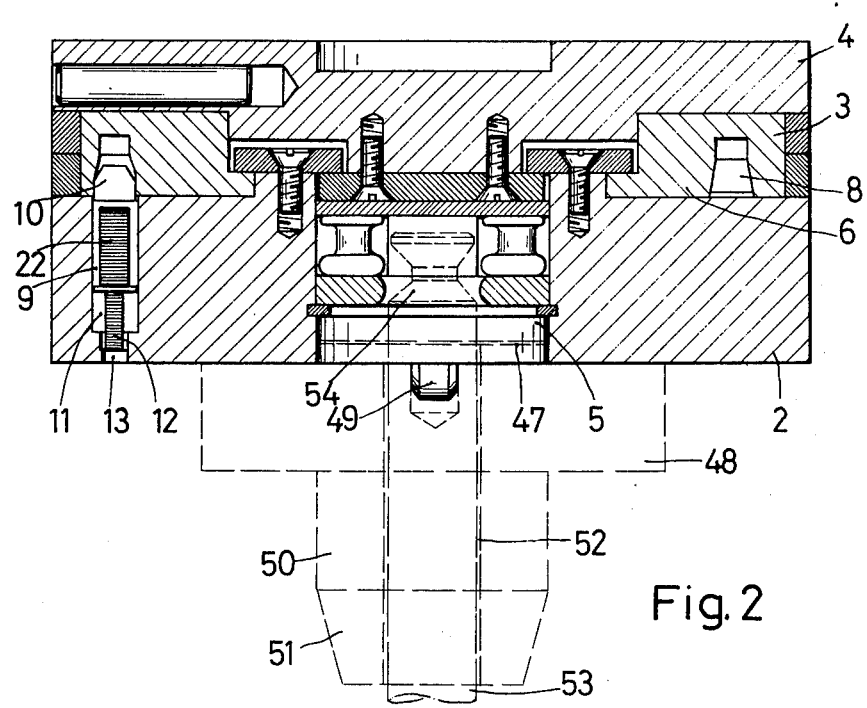

Referring to FIGS. 1–4, there are secured to a spindle 1 three discs 2, 3 and 4 disposed concentrically one above the other. The discs 2 and 3 are formed with respective axial bores 5 and 6. The disc 3, which is disposed between the discs 2 and 4, is formed, at a spacing inwardly of a peripheral face 24 thereof, with axis-parallel bores 8, providing a series of equi-angularly spaced recesses, positioned on a pitch circle, the spacing between the bores 8 being 15°. Associated with these bores 8, in an axis-parallel bore 9 in the outer disc 2, is a displaceable indexing pin 10. Associated with the indexing pin 10 is a coil spring 12 received in a blind bore 11. The coil spring 12 bears at the free end on a plug 13 sealing the bore 9. The indexing pin 10 is so dimensioned that, in a basic position, it projects into one of the bores 8, thereby coupling the two discs 2 and 3 with each other.

Associated with the pin 10 is a displaceably guided adjusting pin 15 having a knurled head 16 and a shank 17 received in a transverse bore 14 of the disc 2. The shank 17 has toothing 21 meshing with a toothed strip 22 on the indexing pin 10. Provided between the head 16 of the adjusting pin 15 and the peripheral face 24 of the disc 2 is reference marking means 23 indicating the basic position between the knurled head 16 and the disc 2.

After displacing the indexing pin 10 against the action of the spring 12, the disc 2 can be rotated relative to the disc 3, whereupon, after release of the adjusting pin 15, the indexing pin 10 snaps, after rotation of the disc 2 relative to the disc 3 through 15°, into a next bore 8. At the peripheral faces of each of the discs 2 and 3 there is provided marking means indicating the positions of the discs 2 and 3 relative to each other.

The axial bore 5 formed in the disc 2 has an annular groove 25 in which is received a snap ring 26 serving to retain an annular bearing member 27. The axial bore 6 formed in the disc 3 includes a portion of enlarged diameter 7. On a shoulder 28 formed thereby there is disposed a clamping member in the form of an intermediate ring 29 which is secured to the disc 2 by screws 30. As can be seen from FIG. 3, the axial bore 6 formed in the disc 3 is larger than the axial bore 5 formed in the disc 2. Disposed under the ring 29 is a disc 31 the diameter of which is intermediate the inner and outer diameters of the ring 29, and which is secured to the disc 4 by screws 32. Between the bearing member 27 and the disc 31 there are guided for transverse movement two engagement members comprising flat discs 18 having on one side a cylindrical attachment 19 whereby the engagement members are in contact both with the member 27 and the disc 31.

The disc 2 is formed with two transverse bores 34 and 35 the axes of which include an angle of approximately 160°, the bores receiving plugs 36 and 37 respectively. The plugs 36 and 37 are formed at the inner ends thereof with oblique contact or clamping faces 38 disposed in the axial bore 5 formed in the disc 2. The plugs 36 and 37 are adapted to be adjusted in and locked in the disc 2 and are located at the level of the discs 18, at the same level as the bores 34 and 35, with two further transverse bores 39 and 40 which are located diametrically opposite each other and symmetrically of the bores 34 and 35. The bores 39 and 40 receive plugs 41 and 42 respectively. The plug 42 is loaded at the outer side by resilient urging means in the form of a coil spring 43 guided in the bore 40. The outer end of the bore 39 is sealed by a plug 44. The plug 41 is guided for displacement lengthwise of the bore 39. Mounted forwardly of the plug 41, and in the axial bore 5, is sectorial mover member 45 provided with a forwardly projecting nose 64 and which abuts the two discs 18. Connected forwardly of the plug 42, and in the axial bore 5, is a sectorial urging member 46 for co-operation with the discs 18. By tightening the spring 43, the urging member 46 can be displaced in the axial bore 5 towards the two discs 18, whereby the discs 18 are lifted out of a V-section annular groove 54 formed in a tool shank 53.

Inserted into the axial bore 5 of the outer disc 2 is an annular collar 47 of a guide attachment 48. The attachment 48 is located relative to the disc 2 by an indexing pin 49. The attachment 48 also comprises a cylindrical portion 50 having a conical face 51. The attachment 48 is formed with an axial bore 52 for guiding the tool shank 53. On tightening the spring 43 and on the displacement, accompanying such tightening, of the discs 18 relative to each other, the latter are advanced towards the groove 54 of the tool shank 53. The tool shank 53 is thereby pulled through the disc 2 and aligned on the disc 31.

The disc 4 adjacent the spindle 1 is formed with a plurality of radially inwardly extending blind passages 55 which are distributed around the periphery of the disc 4, and from the inner end of each of which there extends an axis-parallel branch passage 56 extending in the disc 3. Each of the passages 55 receives a turnable push-in pin 57 provided with an eccentric portion and projecting as far as the branch bore 56. Disposed in each branch bore 56 is a headed pin 58 the head of which is guided in an associated arcuate T-slot 68 formed in the disc 3.

The arcuate slots 68 are so dimensioned that they permit rotation of the discs 3 and 4 relative to each other through at least 20°. By turning the eccentric pins 57, the eccentric portions of which are received in transverse bores of the associated pins 58, the pins 58 are moved lengthwise of the passages 56, and so the two discs 3 and 4 can be clamped relative to each other, and thus locked against relative rotation.

In an axis-parallel bore 59 located between the bores 8, the disc 4 receives an abutment member in the form of a pin 60 projecting into a recess 61 formed in the disc 4 at the periphery thereof. End faces 62 and 63 of the recess 61 are aligned in accordance with radii of the disc 4 and include an angle of at least 20°. The face 63 is undercut, a gauge block stop 65 being inserted into the undercut. Prior to commencing a working step, gauge blocks 66 and 67, as required in each particular instance, are inserted into the recess 61 forwardly of the gauge block stop 65, and the two discs 3 and 4 are sufficiently rotated relative to each other to produce the result that the gauge blocks 66 and 67 are clamped between the gauge block stop 65 and the pin 60. Then, by turning the pins 57, the discs 3 and 4 are clamped to each other.

Owing to the spacing of the apertures 8, the discs 2 and 3 are rotated relative to each other in 15° steps to provide an initial setting of the indexing head. After such initial setting, with the pins 57 released and with the insertion of the requisite gauge blocks 66 and 67, the discs 3 and 4 are rotated relative to each other until the gauge blocks are firmly clamped between the gauge block stop 65 and the pin 60. Thereby, no further fine adjustment or setting of the three discs 2–4 is required, since the gauge blocks permit superfine adjustment of the discs relative to each other down to seconds of arc.

Thus any graduation by means of Vernier scales on the peripheral faces of the individual discs becomes superfluous and read-off errors are avoided, since the exact angular positioning of the discs relative to each other is determined by the gauge blocks.

The indexing head is releasably secured in known manner at the spindle 1.

We claim:

1. An indexing device comprising first, second and third discs substantially coaxial with one another; first and second engagement means of said first and second discs, respectively, interengageable releasably to latch said first and second discs in any selected relative angular position; said second and third discs having respective abutment surfaces; gage means between said abutment surfaces; so that said second and third discs can be angularly positioned relative to each other by turning said second and third discs relative to each other until said gage means abuts both said abutment surfaces; clamping means including a clamping member movable in an axial direction of said discs to clamp said second and third discs against the relative turning; one of said second and third discs having therein a first radially extending passage; the other of said second and third discs having therein a second passage extending transversely to said first passage and communicating with the latter; said clamping means including a first pin turnably received in said first passage and including an eccentric portion; a second pin received in said second passage; and retaining means of said other disc arranged to engage said second pin to limit movement of the latter lengthwise of said second passage, said eccentric portion so engaging said second pin that, by turning of said first pin, said second pin can be moved lengthwise of said second passage into clamping engagement with said retaining means; wherein an axially outer one of said discs is formed with an axial bore for receiving a tool shank; the indexing device further comprising means for releasably engaging the tool shank when inserted into said bore.

2. An indexing device according to claim 1, wherein said last-mentioned engagement means comprises first and second engaging members of circular cross-section disposed in said bore, the axes of said engaging members extending substantially parallel to the axis of said discs, and means operable to move said engaging members so that the latter are received in a recess of the tool shank.

3. An indexing device according to claim 2, wherein said outer disc is provided with first, second, third and fourth transverse bores opening into said axial bore, and said last-mentioned engagement means further includes first and second plug means received in said first and second bores respectively, inner end portions of said first and second plug means having contact faces for contact with said first and second engaging members respectively, third plug means received in said third bore, a mover member in said axial bore and abutting said first and second engaging members, said mover member being movable by said third plug means, fourth plug means received in said fourth bore, an urging member in said axial bore for co-operation with said first and second engaging members, said urging member being engageable with said fourth plug means, and resilient means arranged to urge said fourth plug means towards said urging member.

4. An indexing device according to claim 1, further comprising guide means received in said axial bore, said guide means being formed with a bore for receiving and guiding the tool shank.

5. An indexing device according to claim 1, wherein another one of said discs, adjacent said outer disc, is provided with an axial bore having a shoulder, and the indexing device further comprises an annular clamping member secured to said outer disc and abutting said shoulder, thereby securing said outer disc to said other, adjacent disc.

6. An indexing device according to claim 2, wherein said axial bore is provided with a groove extending therearound, and the indexing device further comprises a snap ring received in said groove, and an annular bearing member retained in said bore by said ring, said first and second engaging members bearing on said bearing member.

* * * * *